United States Patent

Bahman

[11] Patent Number: 5,970,622
[45] Date of Patent: Oct. 26, 1999

[54] FLOOR MOUNTED HAIR DRYING DEVICE

[75] Inventor: Sima Bahman, 2454 Sleepy Hollow Dr., Glendale, Calif. 91206

[73] Assignee: Sima Bahman, Glendale, Calif.

[21] Appl. No.: 09/028,195

[22] Filed: Feb. 23, 1998

[51] Int. Cl.⁶ .................................................. A45D 24/00
[52] U.S. Cl. ............................................................... 34/97
[58] Field of Search ................................ 34/96, 97, 98, 34/99, 100; 132/220, 221, 222, 274; 248/284.1, 288.31, 314, 315, 311.2, 316.5

[56] References Cited

U.S. PATENT DOCUMENTS

| | | | |
|---|---|---|---|
| 2,188,924 | 2/1940 | Rockwood | 34/97 X |
| 4,258,731 | 3/1981 | Tsujimoto et al. | 34/96 X |
| 4,409,998 | 10/1983 | Bauer | 34/96 X |
| 4,809,444 | 3/1989 | Henderson et al. | 34/99 X |
| 5,386,644 | 2/1995 | Lawall et al. | 34/97 X |
| 5,613,305 | 3/1997 | Narrin | 34/97 X |
| 5,636,815 | 6/1997 | Wilson | 34/97 X |

*Primary Examiner*—Henry Bennett
*Assistant Examiner*—Steve Gravini

[57] ABSTRACT

The present invention is designed to allow a user to dry and style hair using both hands while controlling the temperature and air flow using one or both feet. An electric hair dryer is mounted to a flexible arm. The flexible arm is connected to a floor stand such that the floor stand supports the flexible arm with the electric hair dryer mounting. A foot panel is electrically and mechanically connected to the foot control panel allowing foot operation of the invention. A button on the foot control panel allows a user to control hot or cool air for drying the head of the user and an air flow selection device is operated by a foot control device on the foot control panel which allows said user to chose a volumetric amount of air flow with a range of air flow starting from a low flow and gradually increasing to a high flow.

1 Claim, 9 Drawing Sheets

FLOOR MOUNTED HAIR DRYING DEVICE

BACKGROUND OF THE INVENTION

1. Field of Invention

The present invention relates to electric hair dryers generally and, more particularly, but not by the way of limitation, to an electric hair drying device mounted on a flexible positioning arm for adjustability of directing hot/cool air toward the head of the user.

A foot control panel connected to a floor stand may be used to control temperature of the air, air flow (pressure) and, position of the hair dryer.

2. Description of the Related Art

There are many different electric hair dryers available in the market. These devices are widely used for styling and drying the user's hair. Whether portable or immobile, these devices have limitations and disadvantages that makes their usage not so desirable. For instance the immobility and limitation in styling ability in helmet-like dryers and, the requirement of holding the hair dryer with one hand and having to use the other hand to hold the brush/comb and style.

3. Brief Summary of the Invention

The present invention is designed to allow the user to dry and style his/her hair using both hands and control the movements, temperature and the air pressure of the hair dryer with his/her foot This is done by mounting an electrical hair dryer to the end of a flexible arm extended from a floor stand which is controlled by a foot panel.

One objective of this invention is to provide a hair drying device that is controlled by foot. This keeps both hands free for holding the brush or comb and makes drying and styling of the hair much easier.

Other object of the present invention is to provide a flexible arm that can be adjusted to infinite positions left/right, up/down, side to side and circular by using a foot control panel placed on the base of the stand. When the arm moves, it changes the position of the hair dryer to the user's desired place.

It is an additional object of the invention to provide an adjustable height in order for the device to be used in sitting position as well as standing. Children can adjust the stand to their comfortable height easily.

It is a further object of the invention to keep the users cool while drying and/or styling their hair using an adjustable fan placed on the body of the stand maintaining the after shower freshness of the user by keeping his/her body temperature cold. One of the most unpleasant feelings that a person can experience is the perspiration of the body during the drying or styling his/her hair, which takes away the fresh feeling of your skin. By having a fan on the stand this condition can be prevented. The fan can be turned on /off independently so it can be used only as needed.

It is another object of this invention to provide a temperature selection means that allows the user to choose the right amount of heat /cold according to his/her need. This button may be located on the foot control panel extended from base of the stand.

The present invention allows the user to choose the right amount of air flow coming out of the nozzle depending on his/her need by having a range of air pressure starting from low and gradually increasing to high. (also controlled by foot through the foot panel.)

The other object of the present invention is to provide such hair drying device that is mobile and can be relocated from one room to the other/one bathroom to the other and once it is assembled it does not need to be unassembled in order to be relocated. It is not permanently installed on the wall or hung on the door or based on the table or counter therefore, it can be placed independently at any room, anywhere. It is 100% mobile. It can be assembled easily and does not need any professional skill.

The present invention can be manufactured with a hair dryer already installed to the end of the flexible arm and wired to the foot control panel through the hollow body of the stand which in this case will have all the features indicated on the list of claims. It can also be manufactured so that any conventional hand held electrical hair dryer could be placed and secured to the end of the flexible arm. In the later case the flow and the temperature of the air can not be controlled by foot but the position of the hair dryer may be adjusted by the foot control panel since it is attached to the flexible arm and the full range of movement performed by the arm changes the position of the hair dryer.

It is further more the objective of the present invention to extent the comfort and desirability of the device to hair salons and barber shops and to ease their work by having the same principal features altered to their needs. This means to hang the flexible arm from the ceiling above each station (chair). The movement and positioning of the arm and the hair dryer is provided by a track installed on the ceiling allowing the arm to move freely to desired positions through the foot control panel. The hair stylist and/or the barber can use their both hands freely and having the luxury of choosing the temprature of the air and air flow with their foot is a tremendous improvement in the quality of their job.

4. Description of the Drawings

The present invention will be further described in connection with the accompanying drawings, in which.

Figure 1:
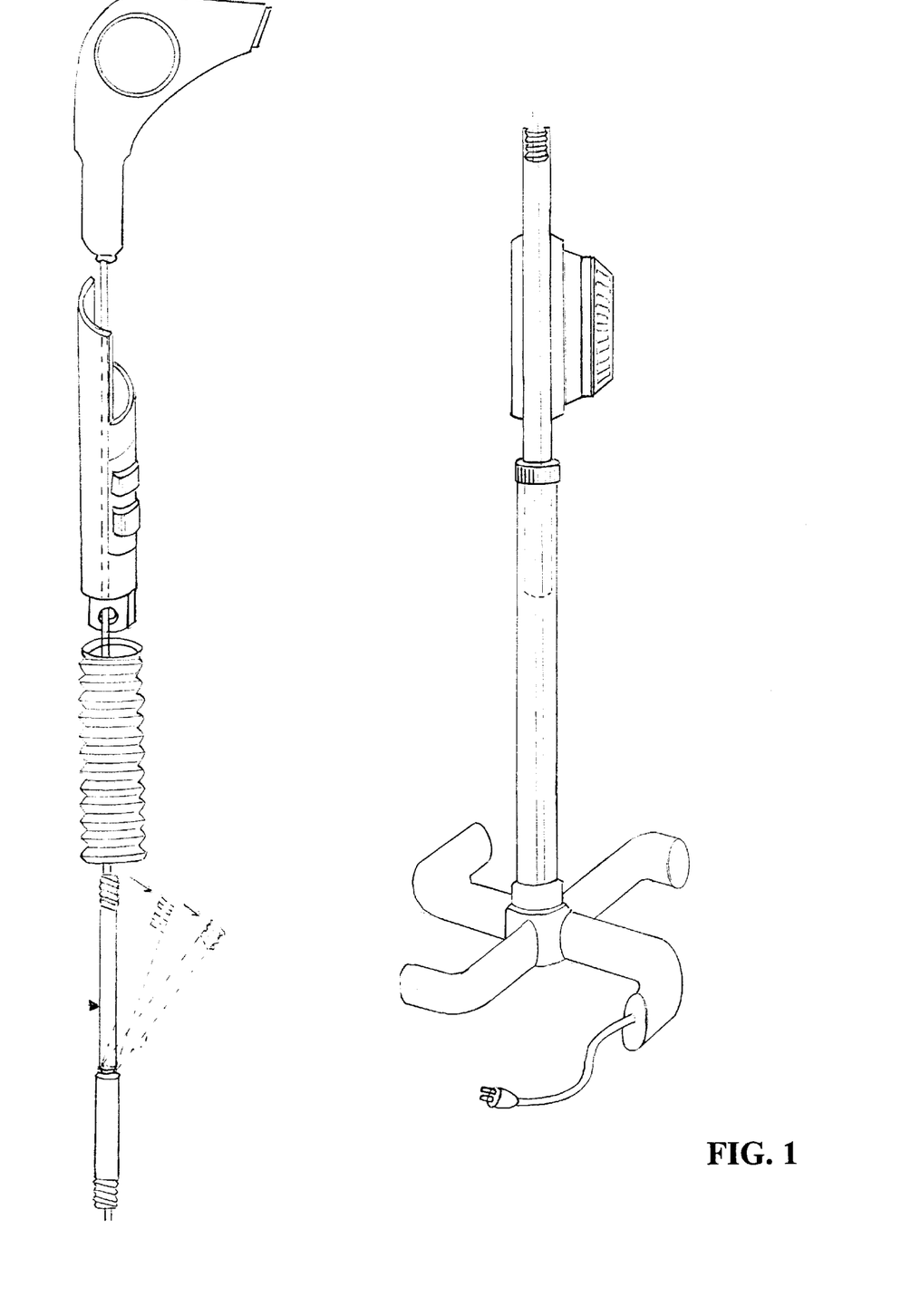
FIG. 1 is a perspective exploded view of the invention, showing it completely from the side.
Figure 2:
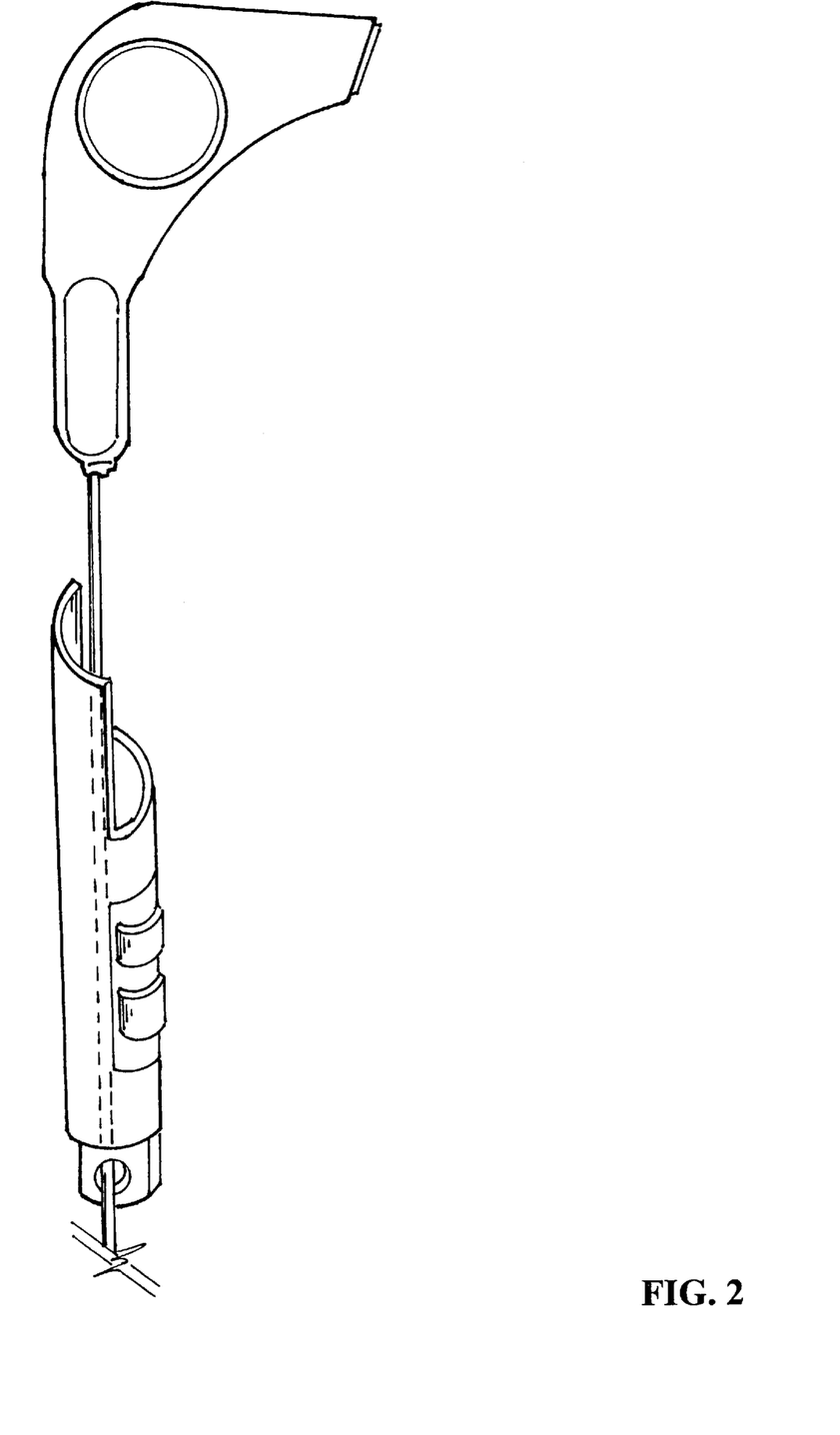
FIG. 2 is a perspective side view of the invention showing the mounting of the hair dryer on the flexible arm.
Figure 3:
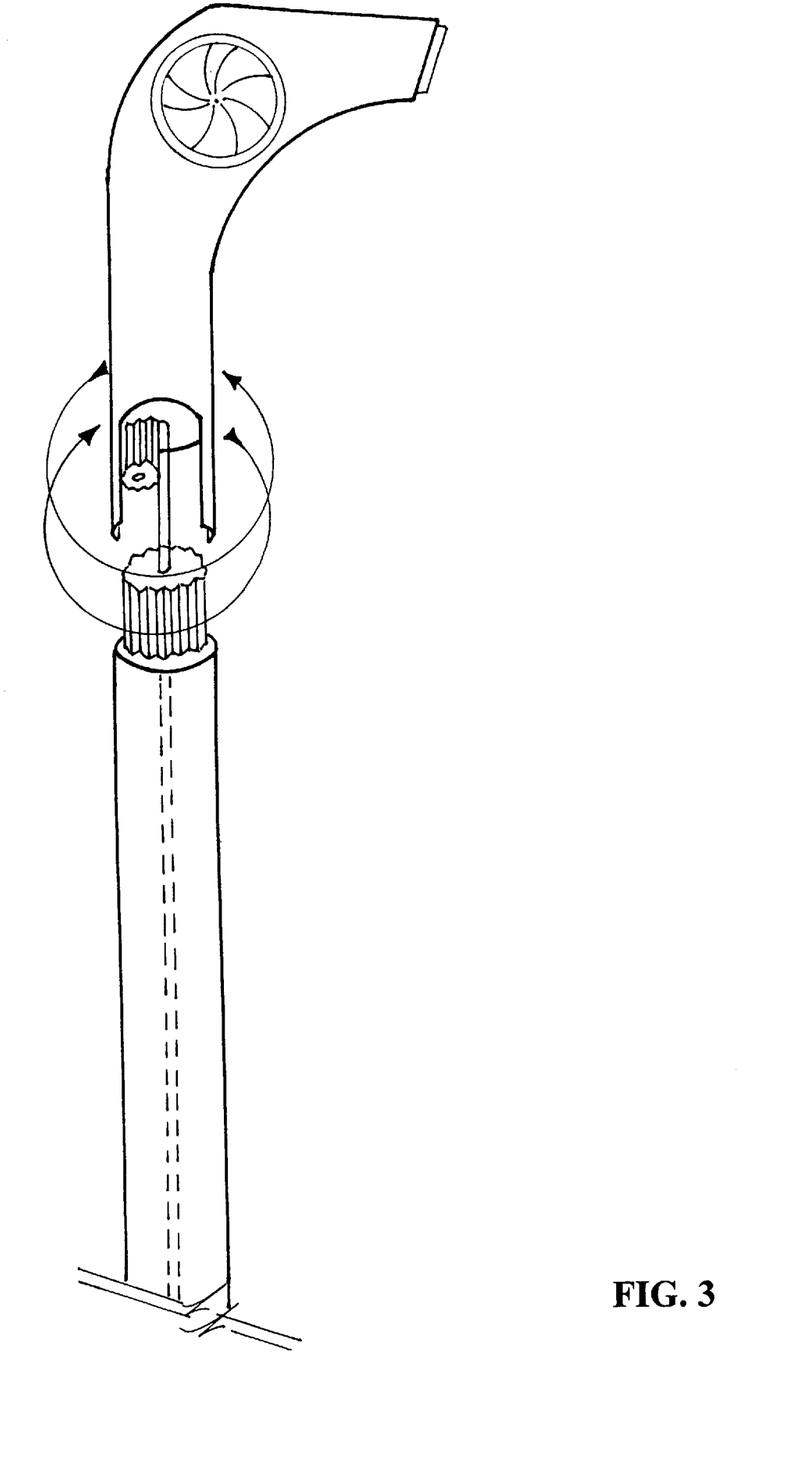
FIG. 3 is a perspective side view of the hair dryer already installed on the flexible arm.
Figure 4:
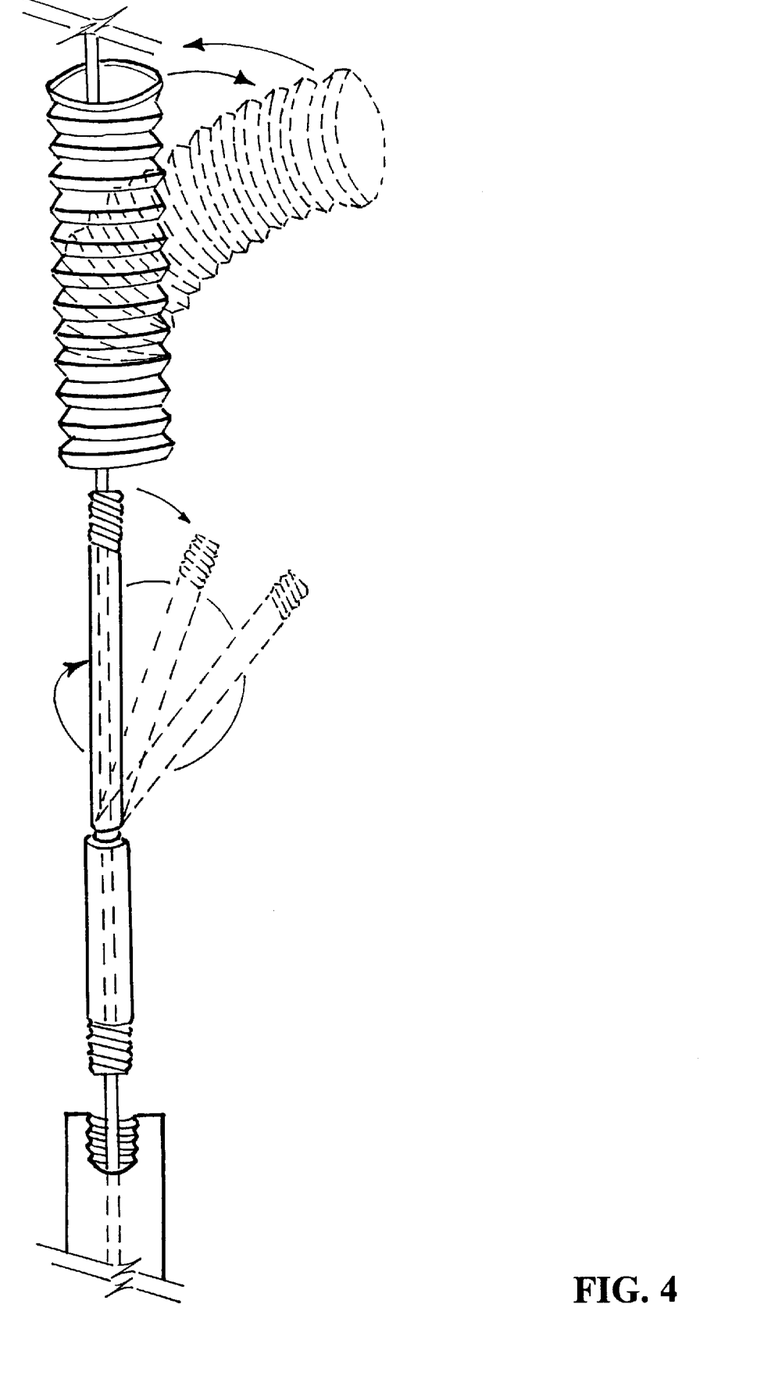
FIG. 4 Shows the flexible arm's mechanism and it's connection to the stand.
Figure 5:
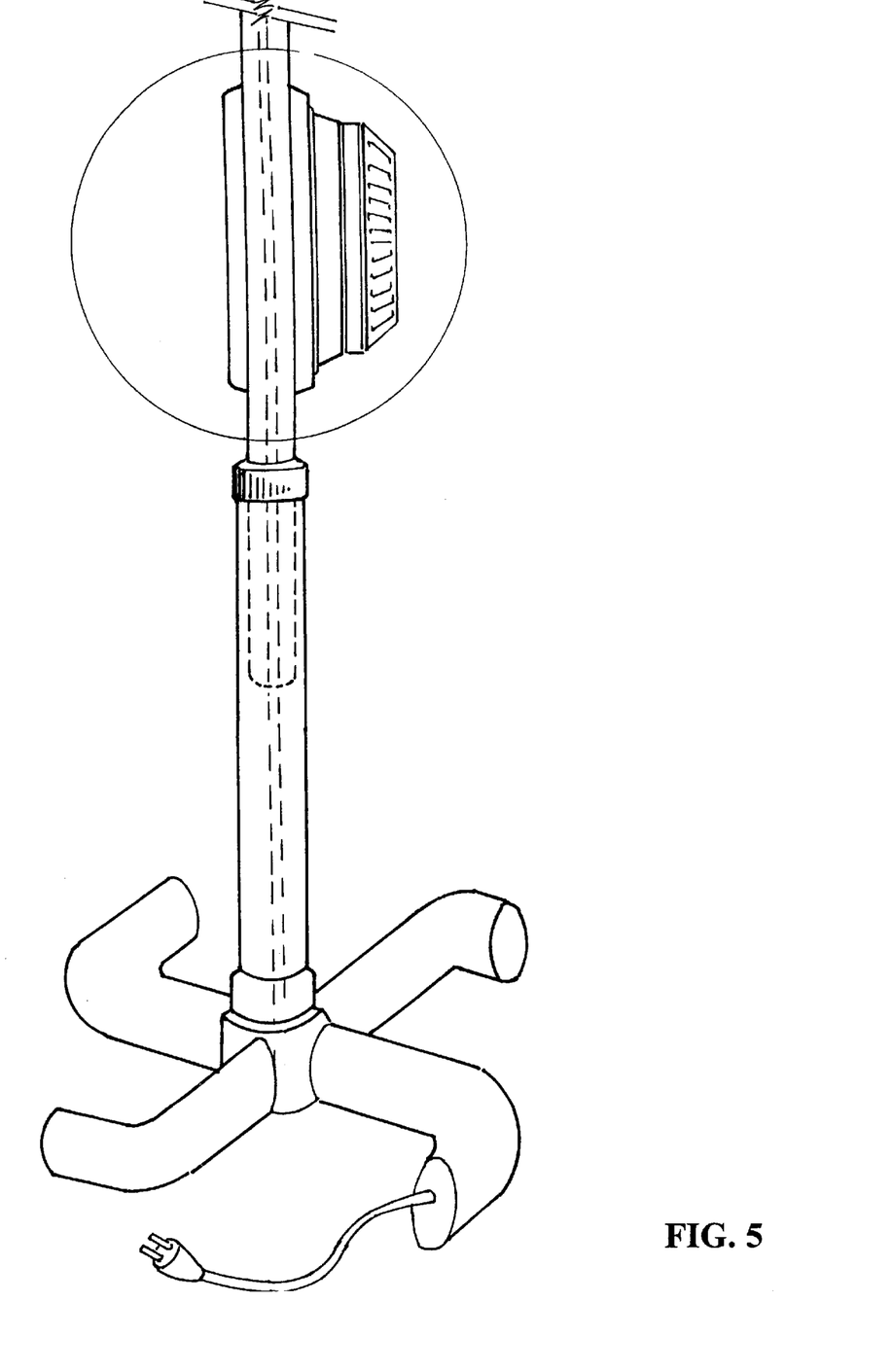
FIG. 5 Shows the side veiw of the fan on the body of the stand. The fan can be turned on/off independently so it can be used only as needed.
Figure 6:
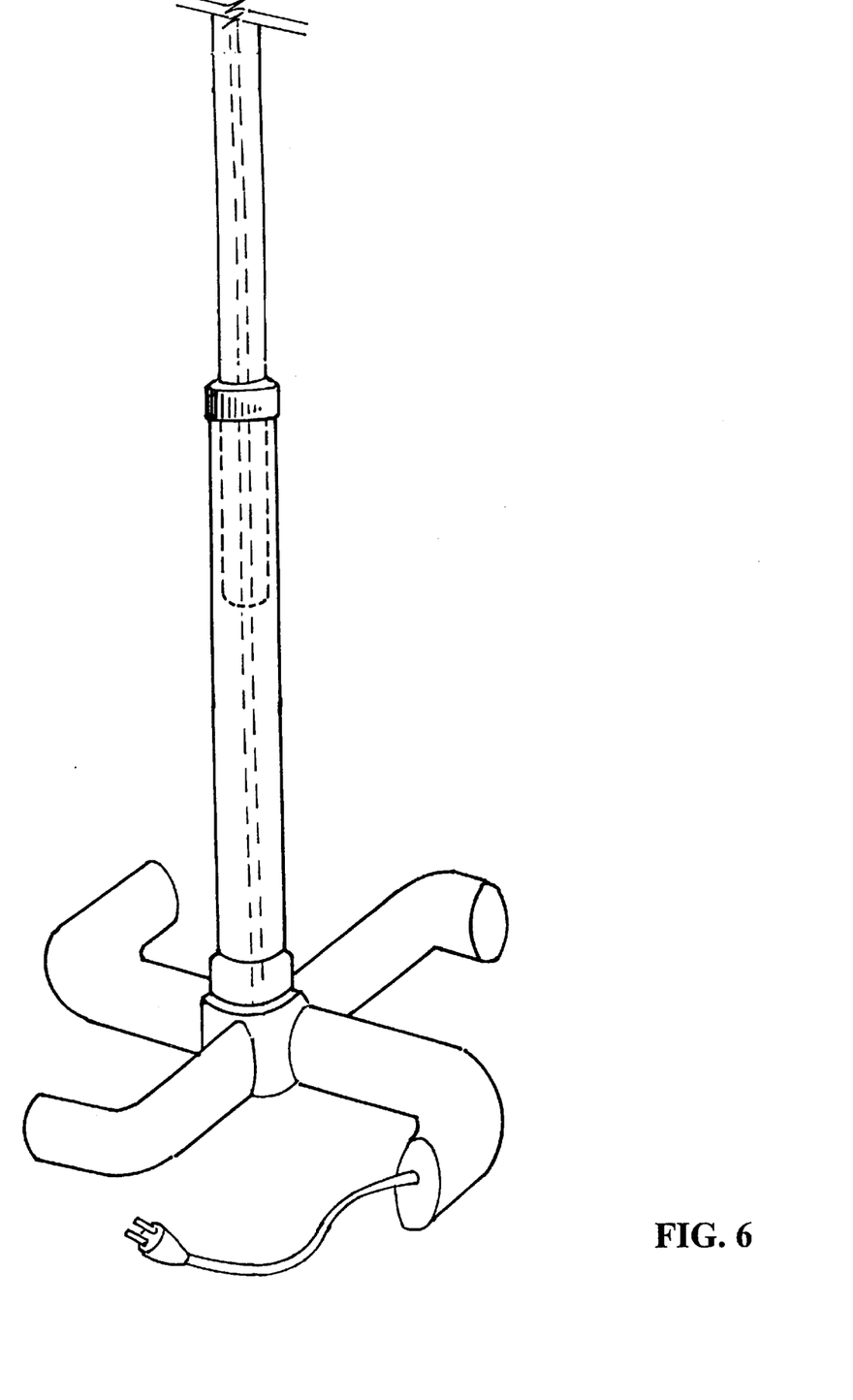
FIG. 6 is a prospective view of the adjustable height mechanism. (One pipe sliding in a bit larger pipe and locked with a ring lock mechanism to create and secure the favorite height.) Any other system of height adjustment can be used.
Figure 7:
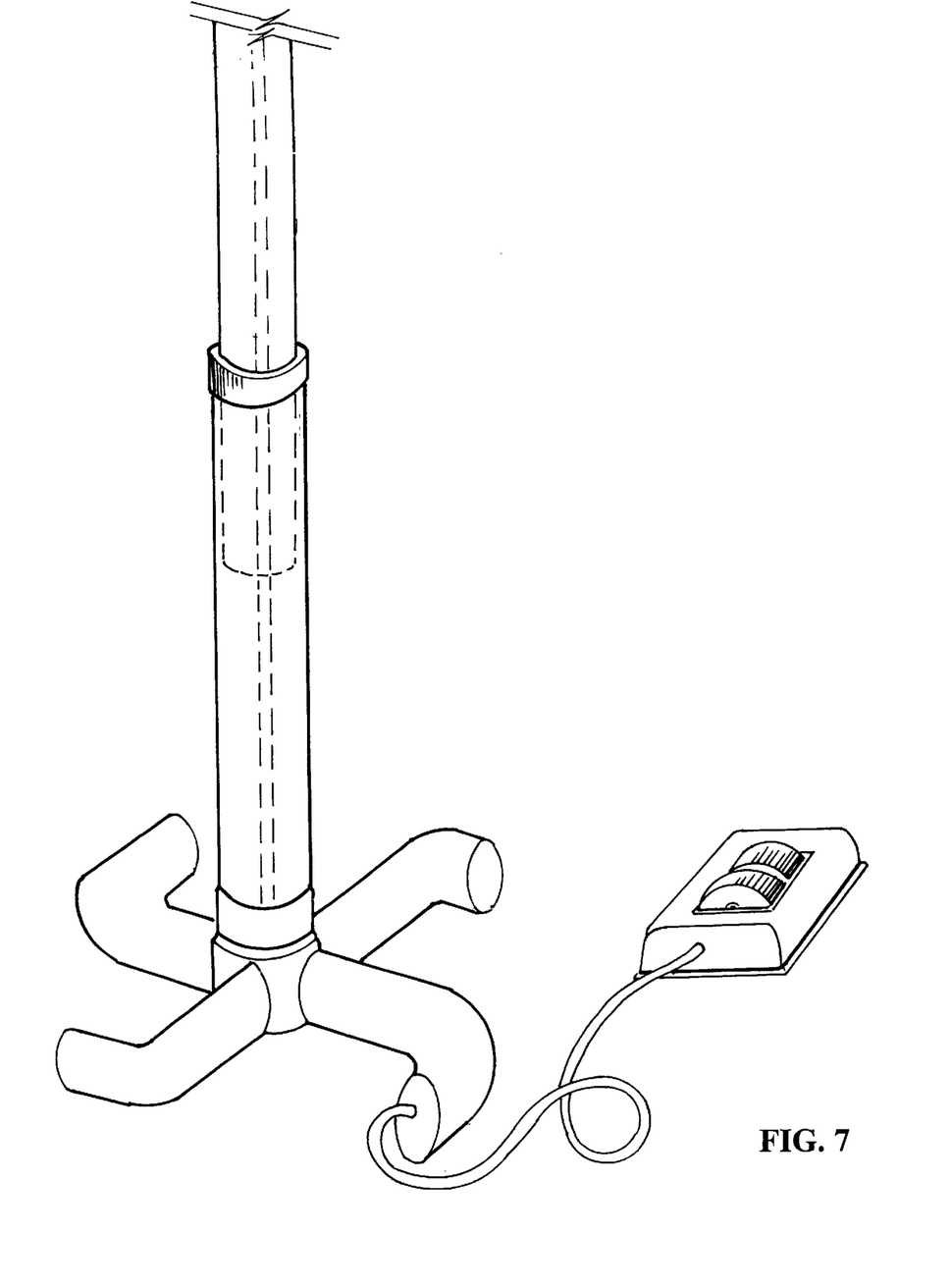
FIG. 7 Shows the foot control panel and it's connection to the stand.
Figure 8:
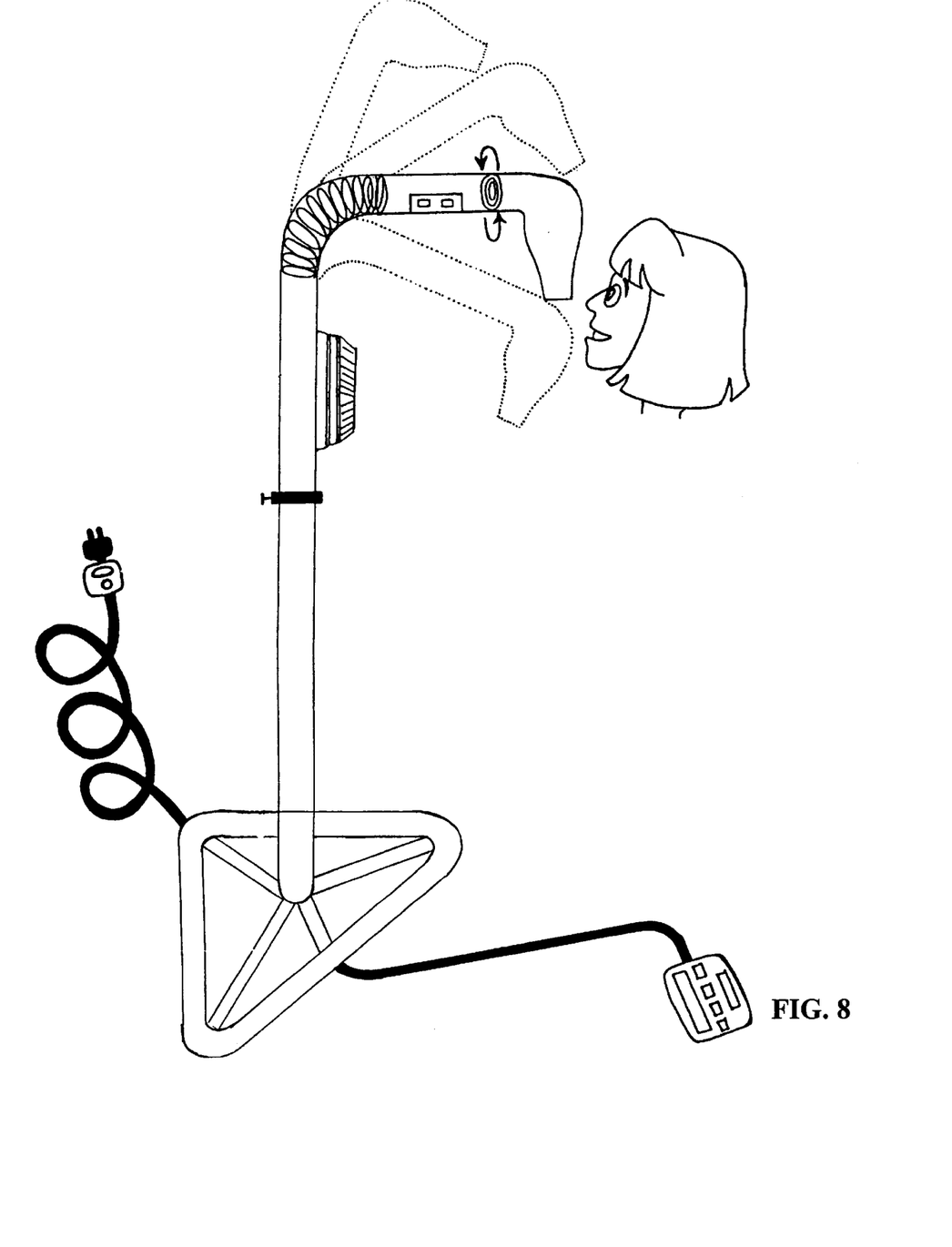
FIG. 8 perspective view of floor mounted hair drying device.

This invention is not by any means limited to the drawings shown here and can be manufactured in different ways to serve the original pupose of the invention which is to improve and expand the usage of the hair dryers by freeing hands of holding them.

I claim:

1. A hair dryer comprising:

an electric hair drying device mounted on a flexible positioning arm for adjustability in directing hot or cool air toward a head of a user;

a floor stand connected to said flexible positioning arm and providing support to said electric hair drying device;

a foot control panel electrically and mechanically connected to said floor stand and allowing foot operation of said electric hair drying device;

a temperature selection means operated by a button on said foot control panel allowing a user to control hot or cool air for drying said head of said user; and an air flow selection means operated by a foot control means on said foot control panel which allows said user to chose a volumetric amount of air flow with a range of air flow stating from a low flow and gradually increasing to a high flow.

* * * * *